US008930694B2

(12) United States Patent
Fernández de Torres et al.

(10) Patent No.: US 8,930,694 B2
(45) Date of Patent: Jan. 6, 2015

(54) METHOD FOR THE GENERATION OF A CODE, AND METHOD AND SYSTEM FOR THE AUTHORIZATION OF AN OPERATION

(75) Inventors: Francisco Fernández de Torres, Madrid (ES); José Manuel Villa Martinez, Madrid (ES); Luis Ugna Carrión, Madrid (ES); Alejandro Tarriño Escudero, Madrid (ES)

(73) Assignee: Banco Bilbao Vizcaya Argentaria, S.A., Madrid (ES)

( * ) Notice: Subject to any disclaimer, the term of this patent is extended or adjusted under 35 U.S.C. 154(b) by 104 days.

(21) Appl. No.: 13/611,814

(22) Filed: Sep. 12, 2012

(65) Prior Publication Data

US 2014/0040617 A1 Feb. 6, 2014

(30) Foreign Application Priority Data

Aug. 2, 2012 (EP) .................... 12382313

(51) Int. Cl.
| | |
|---|---|
| *H04L 9/06* | (2006.01) |
| *H04L 29/06* | (2006.01) |
| *G06F 21/36* | (2013.01) |
| *G06F 21/42* | (2013.01) |
| *H04L 9/32* | (2006.01) |
| *H04L 9/28* | (2006.01) |
| *G06Q 20/32* | (2012.01) |

(52) U.S. Cl.
CPC .............. *H04L 63/08* (2013.01); *G06F 21/36* (2013.01); *G06F 21/42* (2013.01); *H04L 9/3215* (2013.01); *H04L 63/18* (2013.01); *H04L 9/28* (2013.01); *G06Q 20/322* (2013.01); *G06Q 20/3274* (2013.01)

USPC ............................................. 713/168; 380/28

(58) Field of Classification Search
CPC .................................................... H04L 63/0876
USPC ................................... 713/168; 380/28; 726/4
See application file for complete search history.

(56) References Cited

U.S. PATENT DOCUMENTS

| | | | |
|---|---|---|---|
| 7,337,229 B2 | 2/2008 | Dutta et al. | |
| 7,606,560 B2 | 10/2009 | Labrou et al. | |
| 8,500,001 B2 * | 8/2013 | Chiou et al. | 235/12 |
| 2002/0029200 A1 | 3/2002 | Dulin et al. | |
| 2003/0174840 A1 | 9/2003 | Bogan | |

(Continued)

FOREIGN PATENT DOCUMENTS

| | | |
|---|---|---|
| EP | 1705594 A2 | 9/2006 |
| EP | 2128809 A1 | 12/2009 |

(Continued)

OTHER PUBLICATIONS

European Search Report, Dec. 13, 2012.

*Primary Examiner* — Techane Gergiso
(74) *Attorney, Agent, or Firm* — Tristan A. Fuierer; Moore & Van Allen, PLLC (57) ABSTRACT

The present invention relates to a method for generating a code and a method comprising the authorization of an operation carried out by a client on a first server. A second server generating an authorization code according to an encoding method is involved in the authorization. The operations can be transactions, access to a web page, user-to-user payments, user-to-business payments, online user-to-business payments, cash withdrawal in automated teller machines, etc.

23 Claims, 7 Drawing Sheets

(56) References Cited

U.S. PATENT DOCUMENTS

| | | |
|---|---|---|
| 2004/0019564 A1 | 1/2004 | Goldthwaite et al. |
| 2005/0246549 A1 | 11/2005 | Torrubia-Saez |
| 2006/0287904 A1 | 12/2006 | Pieper et al. |
| 2007/0083772 A1* | 4/2007 | Harada et al. ............... 713/193 |
| 2007/0101145 A1 | 5/2007 | Sachdeva et al. |
| 2007/0131757 A1 | 6/2007 | Hamilton et al. |
| 2008/0168537 A1 | 7/2008 | Nakhjiri |
| 2008/0222048 A1 | 9/2008 | Higgins et al. |
| 2010/0017860 A1 | 1/2010 | Ishida |
| 2010/0191602 A1 | 7/2010 | Mikkelsen et al. |
| 2010/0195834 A1* | 8/2010 | Amagai ...................... 380/277 |
| 2010/0218241 A1 | 8/2010 | Faryna |
| 2011/0055084 A1 | 3/2011 | Singh |
| 2011/0125522 A1 | 5/2011 | Kaplan et al. |
| 2011/0238573 A1 | 9/2011 | Varadarajan |
| 2011/0251910 A1 | 10/2011 | Dimmick |
| 2011/0258031 A1 | 10/2011 | Valin et al. |
| 2012/0054046 A1 | 3/2012 | Albisu |
| 2012/0078735 A1 | 3/2012 | Bauer et al. |
| 2012/0095852 A1 | 4/2012 | Bauer et al. |
| 2012/0096277 A1 | 4/2012 | Perez Soria |
| 2012/0124651 A1 | 5/2012 | Ganesan et al. |
| 2012/0150737 A1 | 6/2012 | Rottink et al. |
| 2012/0221474 A1* | 8/2012 | Eicher et al. ................. 705/51 |
| 2013/0062420 A1* | 3/2013 | Hamman et al. ............. 235/494 |

FOREIGN PATENT DOCUMENTS

| | | |
|---|---|---|
| EP | 2166697 A1 | 3/2010 |
| WO | 01/01361 A1 | 1/2001 |
| WO | 2009146106 A1 | 12/2009 |
| WO | 2010056969 A2 | 5/2010 |
| WO | 2011069492 A1 | 6/2011 |
| WO | 2012004158 A1 | 1/2012 |
| WO | 2012005653 A1 | 1/2012 |
| WO | 2012068078 A2 | 5/2012 |
| WO | 2012073014 A1 | 6/2012 |
| WO | 2012088512 A2 | 6/2012 |

* cited by examiner

METHOD FOR THE GENERATION OF A CODE, AND METHOD AND SYSTEM FOR THE AUTHORIZATION OF AN OPERATION

CROSS-REFERENCE TO RELATED APPLICATIONS

This application is filed under the provisions of 35 U.S.C. §119(a) and claims priority to European Patent Application No. 12382313.0, filed on Aug. 2, 2012 in the name of Francisco FERNANDEZ DE TORRES and entitled "METHOD FOR THE GENERATION OF A CODE, AND METHOD AND SYSTEM FOR THE AUTHORIZATION OF AN OPERATION," which is incorporated herein by reference in its entirety.

OBJECT OF THE INVENTION

The present invention relates to a method for generating a code and a method comprising the authorization of an operation carried out by a client on a first server. A second server generating an authorization code according to an encoding method is involved in the authorization. The operations can be transactions, access to a web page, user-to-user payments, user-to-business payments, online user-to-business payments, cash withdrawal in automated teller machines, signing operations, etc.

BACKGROUND OF THE INVENTION

The development and social impact of mobile devices have led to the development of applications for mobiles in the business environment, such as those which make business transactions.

Some mobile devices include software applications which allow capturing QR codes, or quick response codes. The application captures the code, decodes it and transmits the decoded information to a remote server as a request for information about materials for example, such as a purchase order, etc. Such operations are merely an exchange of information and do not include any type of business transaction operation.

PayPal™ is a text only one-way payment system that can be installed in mobile devices. The system works such that information about the payer and the amount to be paid is sent from the mobile device to a server. An operator calls the user of the mobile device after this information is sent so that the user can authorize the transaction.

Obopay™ is a mobile device application the use of which allows a transaction from an Obopay™ account to a business. The use depends on the proprietary software installed in the device, with the drawback that not all devices are prepared to run Obopay™ software.

Other forms of payment using mobile devices comprise the use of barcodes, communication with the merchant by means of wireless technology, such as Bluetooth or infrared, etc. The main drawback is the required use of additional hardware and software both in the client and in the merchant.

However, there are no applications which allow the exchange of funds in a fast and comfortable manner for the user and assure 100% security in said operations and transactions. In addition, the disclosure of this invention allows, in addition to performing transactions, identifying and signing operations in alternative channels that prevent the typical attacks using the means that have been widespread up until now.

DESCRIPTION OF THE INVENTION

The present invention solves the technical problems described above by means of a method for generating a code according to claim 1, an authorization method for authorizing an operation according to claim 5, and an authorization system for authorizing an operation according to claim 15. The dependent claims define preferred embodiments of the invention.

A first aspect of the invention is a method for generating a code, characterized in that it comprises the steps of:
 a.—providing a first character string of W characters,
 b.—encrypting the first character string by means of an encrypting method, obtaining an encrypted string,
 c.—encoding the first encrypted string by means of an encoding method, obtaining an encrypted and encoded string of Y characters,
 d.—splitting the string of Y characters into:
  a public string of M characters, and
  a private string of Y-M characters,
 e.—concatenating at least:
  the public string of M characters,
  additional information,
  obtaining a second character string,
 f.—encoding the second character string with an encoding method, obtaining the code.

Encrypting or enciphering must be understood in the context of the present invention by its conventional meaning, i.e., applying an algorithm for converting the original information into secret information. A message susceptible to being encrypted undergoes at least one transformation by means of a key. The original message is transformed into a binary string by means of the key. The decrypting entity must have the decryption key to obtain the original message.

Encoded or encoding must be understood in the context of the present invention by its conventional meaning, i.e., applying an algorithm for representing information. The Base64 encoding system, for example, which takes groups containing 6 bits and forms characters, can be used to represent a series of binary symbols in one character. It can be seen graphically as follows:

```
000110101110010101110011... →
000110 101110 010101 110011...→
  G      u      V      5
```

The method for generating a code generates a code from a character string of information such that it is secure in the sense that it does not contain sensitive or vulnerable information that can be used by a third party intercepting the code. This code can be used in an authorization method for authorizing an operation such as that described below in the second aspect of the invention.

In a second aspect of the invention, the invention presents an authorization method for authorizing an operation implemented in a system comprising,
 a client,
 a first server,
 a second server in communication with the first server and in communication with the client,
 characterized in that it comprises the steps of:
  a.—requesting the second server a code, the request comprising a string with data about the operation,
  b.—the second server generating a code from a string with data about the operation according to a method for generating a code according to the first aspect of the invention,
  c.—the second server sending the code to the first server, d.—the client transferring the code from the first server to the client, e.—the client decoding the code, obtaining the second character string, f.—the client ending the authorization by sending an authorization confirmation to the second server.

In the authorization method, a user of a client agrees on an operation with a user of a first server. This operation can be a cash transaction between bank accounts of the users. The authorization process for authorizing the operation starts by means of requesting the second server a code, after which the code is sent to the first server, and from the latter it is transferred to the client by means of capturing a QR image or by means of sending via NFC (near field communication) technology.

Finally, the client sends the authorization to the second server who can perform the operation.

A third aspect of the invention is an authorization system for authorizing an operation comprising the following entities, a client, a first server, and a second server in communication with the first server and in communication with the client, characterized in that the three entities are suitable for implementing the steps of a method according to the second aspect of the invention, the second server is suitable for implementing the steps of a method for generating a code according to the first aspect of the invention, and the client is suitable for decoding a code generated by means of a method according to the first aspect of the invention.

A fourth aspect of the invention is a computer program or application, characterized in that it comprises program code means for performing the steps of a method according to the first aspect of the invention when said program works in a computer, or program code means for performing the steps of a method according to the second aspect of the invention implemented by the client, or program code means for performing the steps of a method according to the second aspect of the invention implemented by the first server, or program code means for performing the steps of a method according to the second aspect of the invention implemented by the second server.

A fifth aspect of the invention is a medium that can be read by a computer, or processor of any type, including a server processor, smartphone mobile telephone, tablet, etc characterized in that it contains a computer program or application comprising program code means for performing the steps of a method according to the first aspect of the invention when said program works in a second server, or a computer program or application comprising program code means for performing the steps of a method according to the second aspect of the invention when the steps are implemented by the client, or a computer program or application comprising program code means for performing the steps of a method according to the second aspect of the invention implemented by the first server, or a computer program or application comprising program code means for performing the steps of a method according to the second aspect of the invention implemented by the second server.

All the features and/or steps of the methods described in this specification (including the claims, description and drawings) can be combined in any manner with the exception of combinations of such mutually exclusive features.

DESCRIPTION OF THE DRAWINGS

These and other features and advantages of the invention will be more clearly understood from the following detailed description of a preferred embodiment, given solely by way of non-limiting illustration, in reference to the attached drawings.

DETAILED DESCRIPTION OF THE INVENTION

Method for Generating a Code

Figure 7:
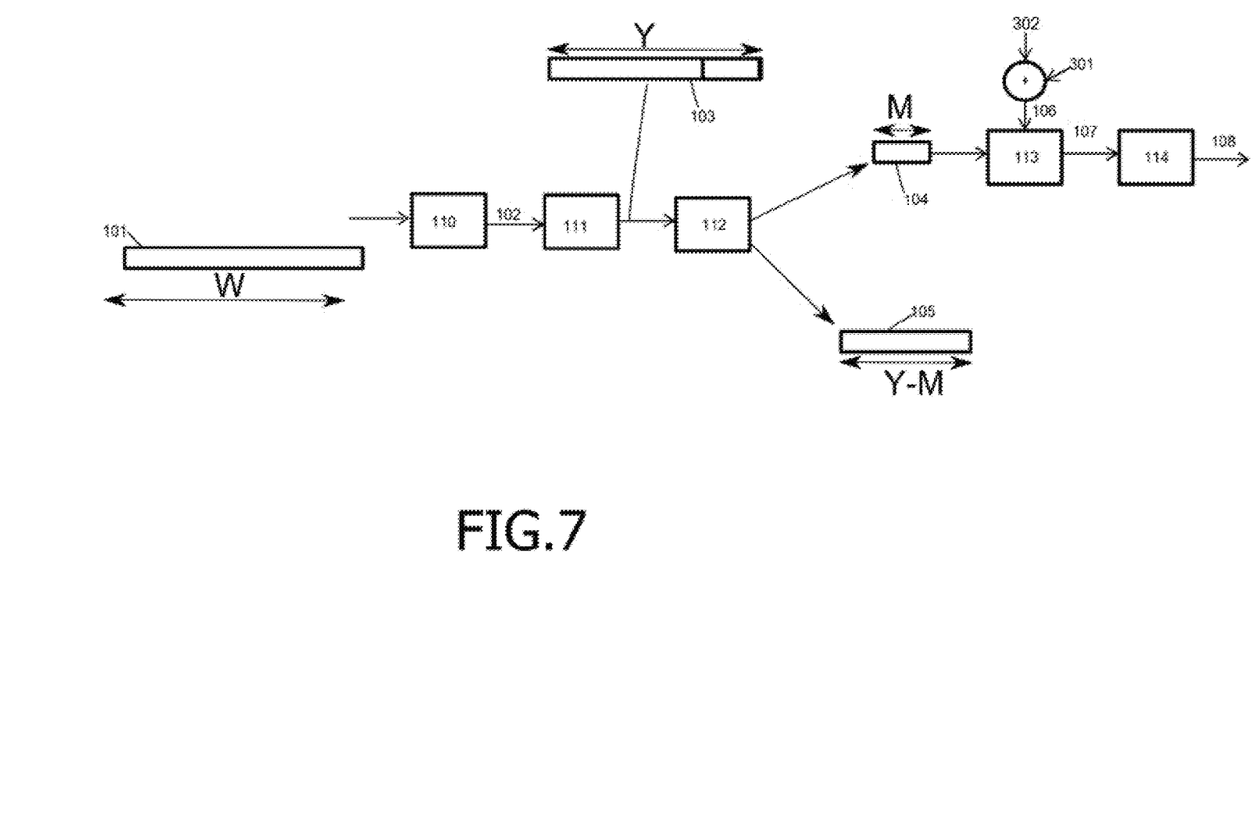
FIG. 7 shows a particular embodiment of a method for generating a code according to the invention.

As can be seen in FIG. 7, a method for generating a code (108) according to the invention comprises the steps of:

a.—providing a first character string (101) of W characters, b.—encrypting (110) the first character string (101) by means of an encrypting method, obtaining an encrypted string (102), c.—encoding (111) the first encrypted string (102) by means of an encoding method, obtaining an encrypted and encoded string of Y characters (103), d.—splitting (112) the string of Y characters (103) into:

a public string of M characters (104), and a private string of Y-M characters (105), e.—concatenating (113) at least:

the public string of M characters (104), and additional information (106), obtaining a second character string (107), f.—encoding (114) the second character string (107) with an encoding method, obtaining the code (108).

The encryption method (step b) and encoding method (step c) are methods known in the state of the art.

The code is a set of signs and rules which allows formulating and comprehending a message. In the scope of the present invention, the message is the character string (101) of W characters that is to be encoded and the code can be a two-dimensional code, a barcode, a hexadecimal code, a code in the form of an image, etc.

In a particular embodiment of the method for generating a code (108), the encoding method of step f.— is a method for generating a QR code (quick response code) which can advantageously be used to be captured by means of image capture, for example by scanning, from a device comprising an image sensor.

In one embodiment of a method for generating a code according to the invention, the additional information in step e.— comprises at least:
- a database identifier (301) indicating a memory address of a storage unit where the private string of Y-M characters (105) is stored,
- a prefix (302).

In one embodiment of the invention, the method for generating a code comprises the following steps prior to step a.—:
- providing information (201), which is preferably encrypted and encoded information,
- decoding and decrypting this information if the information (201) is encrypted and encoded information,
- generating (210) a random number (202),
- concatenating (211) the random number to all or part of the information (201) provided, an initial string (101) being obtained.

The information can be provided in a character string, XML, etc. . . . .

The information (201) can be encrypted by means of a CBC encryption mode or any other encryption mode and can be encoded in Base32.

By using the CBC encryption mode, a 128 bit block binary is obtained. When subsequently encoding in Base32, 25 characters are obtained for every 128 bit block.

Therefore in a particular embodiment of the method for generating a code according to the invention, in step d.—relating to the action of splitting (112) the string of Y characters into a public string of M characters and a private string of Y-M characters, the number M=26 is chosen, which number advantageously separates a whole 25 bit block and a small part from the rest of the string, which increases security and makes it impossible to decrypt the information without the public and private part of the information. If less than a whole block is taken, a third party could decode and decrypt the information.

System for Generating a Code

Figure 2:
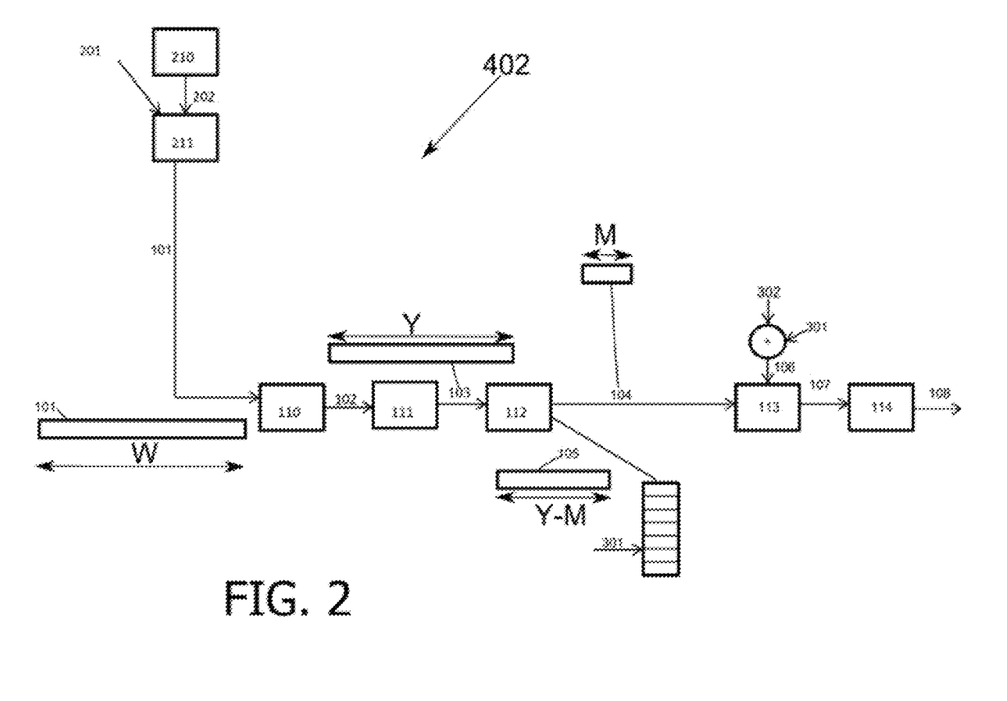
FIG. 2 shows an embodiment of a block diagram depicting the implementation of a method for generating a code according to the invention.

FIG. 2 shows an embodiment of a system in block diagram depicting the implementation of a method for generating a code (108) according to the invention. These blocks comprise processing means which are suitable for implementing the steps of a method for generating a code (108) according to the invention.

Authorization System for Authorizing an Operation

Figure 1:
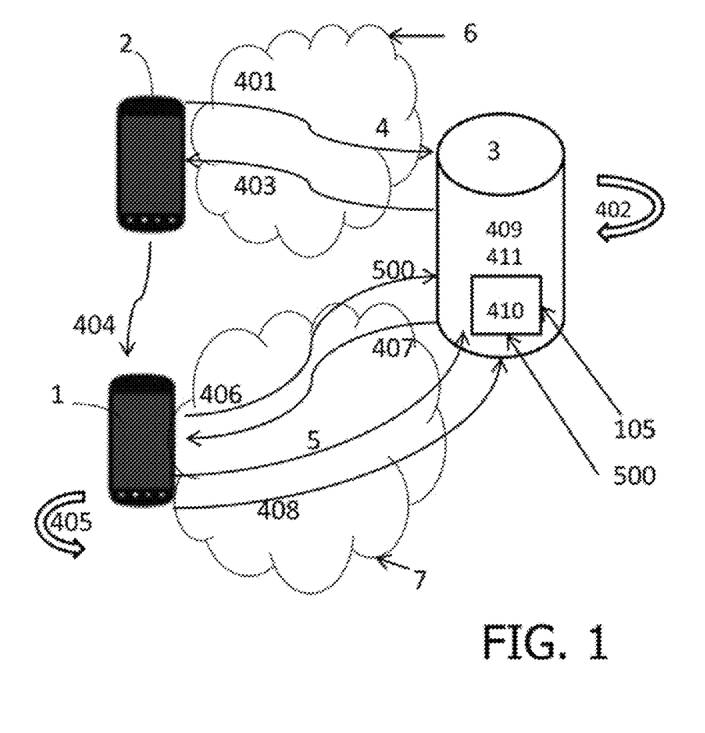
FIG. 1 shows an example of a block diagram implementing the steps of an authorization method for authorizing an operation according to the invention.

An authorization system for authorizing an operation according to the invention comprises the following entities, depicted by way of example in FIG. 1:
- a client (1),
- a first server (2), and
- a second server (3) in communication with the first server (2) and in communication with the client (1), characterized in that
- the three entities (1, 2, 3) are suitable for implementing the steps of a method according to the second aspect of the invention,
- the second server (3) is suitable for implementing the steps of a method for generating a code (108) according to the first aspect of the invention, and
- the client (1) is suitable for decoding a code (108) generated by means of a method according to the first aspect of the invention.

In a particular embodiment, the system is characterized in that the first server (2) is in communication with the second server (3) through a first communication network (6) and the client (1) is in communication with the second server (3) through a second communication network (7).

In a particular embodiment, the system is characterized in that the first server (2) is in communication with the second server (3) through a first communication network (6) and the client (1) is in communication with the second server (3) through the same first communication network (6).

Authorization Method for Authorizing an Operation

FIG. 1 shows a particular embodiment of the method according to the invention. This embodiment comprises the following steps:
- a.—requesting (401) the second server (3) a code (108), the request comprising a string with data (4) about the operation,
- b.—the second server (3) generating (402) a code (108) from a string with data (4) about the operation according to a method according to the first aspect of the invention,
- c.—the second server (3) sending (403) the code (108) to the first server (2),
- d.—the client (1) transferring (404) the code (108) from the first server (2) to the client (1),
- e.—the client (1) decoding (405) the code (108), obtaining the second character string (107),
- f.—the client (1) ending (408) the authorization by sending an authorization confirmation to the second server (3), In a particular embodiment, step g.—: the second server (3) running (409) the operation, is implemented after step f.—.

In one embodiment, in step g.— running (409) the operation is performed if a single-use key (5) sent from the client (1) to the second server (3) is correct where a correct single-use key (5) is a single-use key (5)
- **known by the second server (3) and
- **associated with the operation to be run.

In a particular embodiment, the string with data (4) about the operation is the string which is provided in step a.— relating to the action of providing a string of information (201) of the method for generating a code according to the invention.

In a particular embodiment of the invention, the authorization method comprises steps e1.— and e2.— between steps e.— and f.—. Steps e1 and e2 comprising:
- e1.—the client (1) requesting (406) information about the operation from the second server (3), and
- e2.—the second server (3) providing (407) the information about the operation.

In this particular embodiment, security of the method advantageously increases because vulnerable information is not sent in the code (108) and relevant information for carrying out the operation is only received in the client (1).

In a particular embodiment, the method for generating a code stores the private string of Y-M characters (105) which, together with the public string of Y characters (104), represents information that allows the second server (3) to obtain all the necessary data about the operation such that they are enough to provide (407) the information about the operation to the client (1) so that the latter ends (408) the authorization of the operation.

The client (1) transferring (404) the code (108) from the first server (2) to the client (1) is advantageously implemented by means of capture by the client (1), which capture can be an image capture of a QR code (108) or capture of a code (108) by means of NFC technology.

In a particular embodiment, the operation is a bank transfer operation from an account associated with the client (1) to a bank account associated with the first server (2). In the particular embodiment in which steps e1 and e2 are implemented, it is advantageously not necessary to send relevant information in the code (108). It is therefore possible to generate a code (108) which by itself does not give interpretable information and such that the relevant information is sent only to the client (1) in step e2.

In the particular embodiments of the invention, the client (1), the first server (2) and the second server (3) have the encoding tables and the encryption and decryption keys, which prevents them from being sent over a communication channel.

In the particular examples described below, the client (1) can be any one of a tablet, a robot, a computer, a smartphone, or any other device with the capacity to communicate through a communication network. In different examples, the device is suitable for browsing web pages, communicating with the first server (2) and communicating with the second server (3). The client (1) can be used by a user or machine.

PARTICULAR EMBODIMENTS OF THE METHOD ACCORDING TO THE INVENTION

Example 1

Transaction from One Mobile Device to Another Mobile Device

Figure 3:
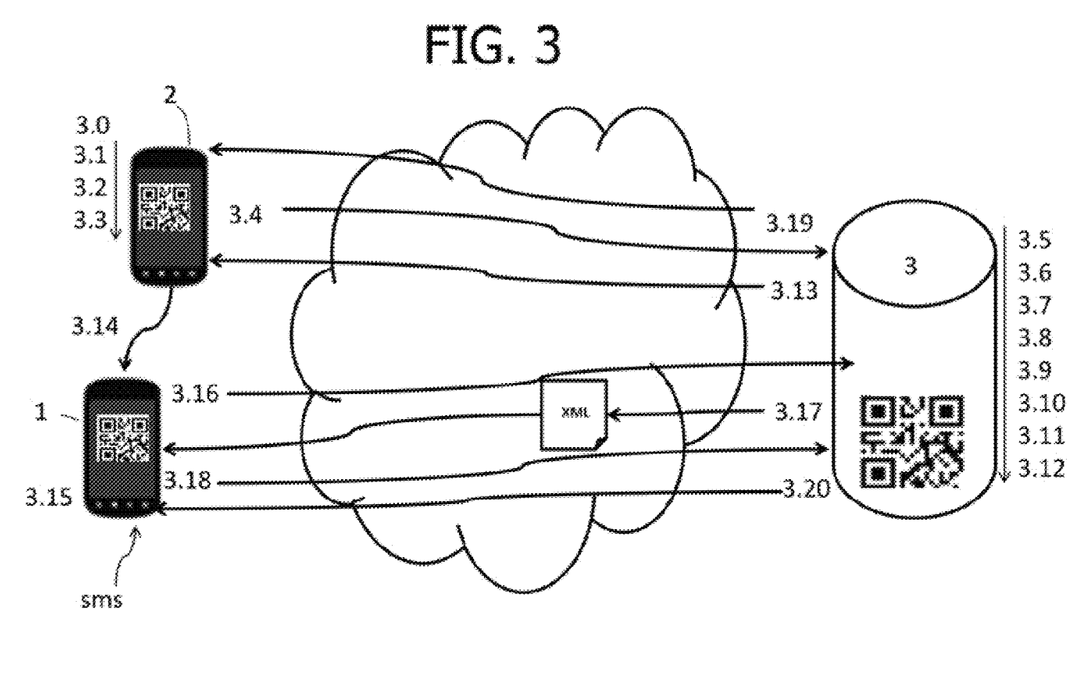
FIG. 3 shows a particular embodiment of a method according to the invention, in which an example of the method implemented by the three main communication entities in a transaction on QR made from a mobile device to another mobile device is shown.

FIG. 3 shows a particular embodiment of the method according to the invention, in which an example of the method implemented by the three main elements of the communication in a QR transaction made from one mobile device to another mobile device is shown.

Two elements or entities are involved in the transaction:
Collector or first server entity (2): entity that receives the funds of the transaction. A mobile device which is suitable for payment transactions through a QR code is used to carry out the transaction. The mobile device is thus suitable for displaying the image of a QR code on a screen to a user, from where it is scanned by the user who must pay.
Payer or client (1) entity: entity that pays the funds of the transaction to be made. In this particular example, the client (1) is a smartphone mobile device and uses an image sensor installed in the smartphone mobile device to scan the QR code displayed on the screen of the collector or first server entity (2). For that purpose, the payer has a mobile device application suitable for performing the payment transaction on QR.

This embodiment corresponds, for example, to the example of a collector requesting a transfer to a payer. The payer and collector devices can be used by two users.
Descriptive Flow of the Process:
3.0.—The first server (2) collector mobile device starts the transaction and labels it as a payment operation with QR code.
3.1.—The first server (2) collector mobile device generates an XML (Extensible Markup Language) file comprising:
a collector identifier,
a concept,
the amount requested,
account number.

3.2.—The first server (2) collector mobile device encrypts the XML file generated using an AES (Advanced Encryption Standard) encryption scheme, in CBC (cipher-block chaining) mode, known by the client (1) and the second server (3).
3.3.—The first server (2) collector mobile device encodes the result of the previous phase in Base64, obtaining a character string having a variable size depending on the information that is being encrypted as a result.
3.4.—The first server (2) collector mobile device sends the encrypted and encoded XML file to the second server (3), for example by means of the https protocol, invoking a web service, for example a REST (Representational State Transfer) service, for generating a QR code and sending as parameters:
internal collector mobile device application identifier,
internal application key,
character string resulting from encryption and encoding,
prefix (302) of the string that will contain the QR code
size of the QR,
color of the QR,
QR level of redundancy,
image format.

The method is performed in the client (1), first server (2) and second server (3) as the result of an application running in each one. The internal identifier and the internal key correspond to the internal and proper identifier and key of each application running in each entity (1, 2, 3).
3.5.—The second server (3):
checks that the internal application identifier of the second server (2) collector mobile device and the internal key are correct, where correct means that the data are comprised in an internal database of the second server (3),
decodes and decrypts the information received and
uses the collector identifier to check that the one who requests for the generation of the QR is correct. Security is thus advantageously increased because only entities known by the second server (3) may generate a QR code using the second server (3),
receives the name and last names or company name of the collector, which will be added to the information about the transaction before generating the QR code.
3.6.—The second server (3) generates a random number.
3.7.—The second server (3) generates a string by concatenating
the random number generated,
amount,
concept,
account number of the collector,
name and last names or company name of the collector, and
currency,
obtaining a string such as for example: "Num=1234567890&name=Fernando Fernandez&concept=Dinner on Wednessday&amount=35& currency=euro&num_cc=43530049884993829384".

Advantageously, the random number included allows the string to always be different from the rest, even for operations of the same account holder and for the same amount and account. In a particular example, the random number that is generated and added to the beginning of the string is 10 digits long.
3.8.—The second server (3) encrypts the string generated using an AES (Advanced Encryption Standard) encryption scheme in CBC (cipher-block chaining) mode and the result is encoded in Base32 with its own conversion table, which advantageously increases encoding security.

In one embodiment, encrypting and encoding the string of point 3.7 is represented as follows:

```
"Num=1234567890&name=Fernando    Fernández&concept=Dinner    on
Wednesday&amount=35currency=euro&num_cc=43530049884993829384"
```

↓

```
1001001111001001010101001001010101010010101110000101001001010
1010101...............
```

↓

```
AEABMSSDLKAAASDLEOEDASOKDOSDMFOSDMFOMFDOSMF................
```

3.9.—The second server (3) splits the string obtained into 2 parts:
- one part will contain the first 30 characters of the string and will be the "public" part of the information, and
- the rest of the string is stored in the database of the second server (3), being the "private" part of the information.

The public part will be sent in a QR code, whereas the private part resides in the second server (3). Therefore advantageously, even though a third party tries to decode and decrypt the content of the string of the QR code, he/she cannot do so because he/she does not have the whole string to decode and decrypt, only the first 30 characters.

3.10.—The second server (3) generates a database identifier used to locate the private information stored in the database.

3.11.—The second server (3) generates a string with the following data:
- prefix (302), which is preferably bbvaqr://bbva? for example,
- string of 30 characters obtained or public part of the information,
- database identifier generated.

In one embodiment, this string is as follows: "bbvaqr://bbva?pp=ADFKERORMVMOECALSPPORJWIDOL SKM&id_data_base=329873".

Advantageously, since the prefix is recognized by the receiver of the QR code (108), it directly accesses the application running in the client (1) for the correct interpretation of the QR code (108).

In a case in which the code (108) is read from the client (1) using a standard BIDI code reading application and the application is installed, the application is run in that moment.

3.12.—The second server (3) generates a QR code with the string of the preceding point, for example:
- setting the image format to bmp or bitmap format,
- establishing the appropriate size for the collector mobile device, and
- advantageously obtaining the lowest possible density with a level of redundancy at zero, the level of redundancy being the number of error correction bits used and the density being the number of bits used for generating the code.

Advantageously in this embodiment, the QR code always contains the same amount of information, and therefore the density thereof never changes, regardless of the size of the complete information, because the first 30 characters are always sent and the rest is stored in the database. The QR code, therefore, does not contain sensitive data about the transaction.

3.13.—The second server (3) sends the image of the QR code to the collector mobile device and the latter displays it on the screen. In this particular embodiment, the QR has a validity for a predetermined time, for example 48 hours, which advantageously prevents being able to reuse the code.

3.14.—The client (1) or payer mobile device scans the image of the QR code using the image sensor. In an alternative embodiment, instead of scanning the QR code it is sent to the e-mail of a payer user handling the client (1) or payer mobile device.

3.15.—The client (1) or payer mobile device obtains the content of the QR code.

3.16.—The client (1) or payer mobile device applies a URL encode method to the content and sends it as a parameter in a call to a web service, for example a REST (Representational State Transfer) service for requesting validation in the second server (3) with the following parameters:
- content of the QR after the URL encode,
- internal client (1) entity identifier,
- internal client (1) entity key,
- information receiving mode, for example, json (JavaScript Object Notation) or XML.

The receiving mode is the manner in which the second server (3) sends the data about the transaction to the device or client (1) or payer entity once the QR code is validated.

The internal identifier and the internal key belong to the client (1) and serve to uniquely identify the client. Similarly, the first server (2) or collector mobile device also comprises an internal identifier and an internal key for uniquely identifying it.

3.17.—The second server (3):
- receives the request for validation of the information about a QR code,
- checks that the client (1) entity identifier and the client (1) entity key are correct,
- accesses the private string stored in the database and retrieves it to attach it to the 30 other characters using the database identifier,
- concatenates the 30 characters received in the request for validation with the private string of the database and decodes and decrypts them, obtaining all the information relating to the operation,
- generates a json or XML with information about the transaction and sends it to the client (1) or payer entity in a secure manner or by means of the https protocol.

In this particular embodiment, the method for generating a code stores the private string of Y-M characters (105) which, together with the public string of Y characters (104), represents information that allows the second server (3) to obtain all the necessary data about the operation for providing (407) the information about the transaction to the client (1) so that the latter authorizes (408) the operation.

3.18.—The client (1) or payer mobile device entity:
- receives the data about the transaction,
- reviews the data about the transaction,
- authorizes the operation by means of the operation key in the event of agreement,
- receives a single-use key, which is sent by means of an sms in a particular embodiment, if the operation key is correct
- the transaction is completed by sending the single-use key to the second server (3).

3.19.—The first server (2) or collector receives a confirmation of the correct termination of the transaction.

3.20.—The client (1) or payer mobile device receives the confirmation of the correct termination of the transaction and of the details corresponding to it.

Example 2

Transaction from a Client Mobile Device with a POS Terminal

Figure 4:
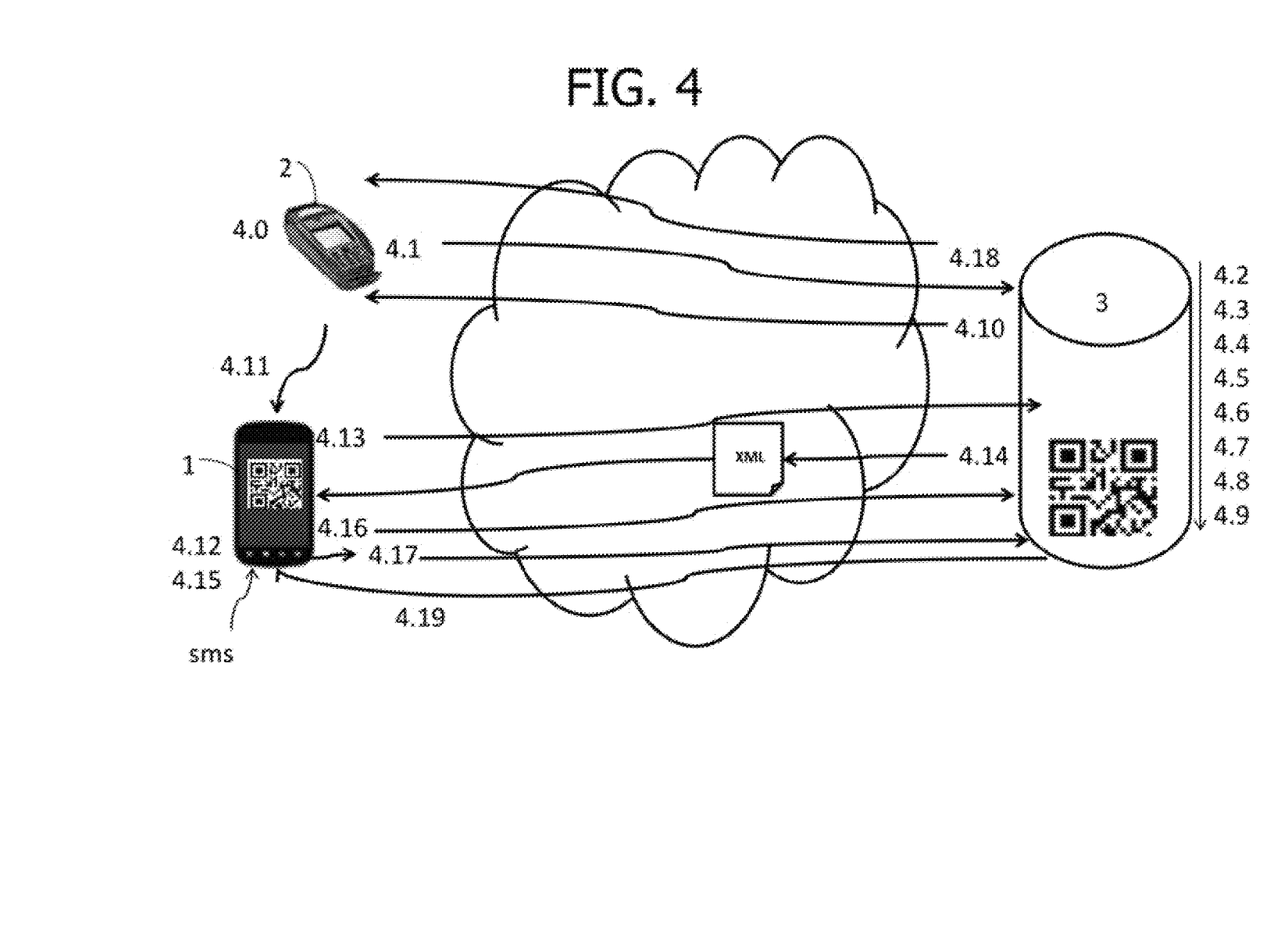
FIG. 4 shows a particular embodiment of a method according to the invention, in which an example of the method implemented by the three main communication entities in a QR transaction made from a client mobile device in a physical place of business with a first server such as a POS or point-of-sale terminal is shown.

FIG. 4 shows a particular embodiment of the method according to the invention, in which an example of the method implemented by the three main communication entities in a QR transaction made from a client (1) mobile device in a physical place of business with a first server (2) such as a POS or point-of-sale terminal is shown.

Two elements or entities are involved in the transaction:
- Collector or first server entity (2): entity that receives the funds of the transaction. A POS terminal device is used to carry out the transaction. The POS terminal is suitable for payment transactions through a QR code. The POS terminal is thus suitable for displaying the image of a QR code on a screen from where it is scanned by the client (1) entity as an alternative to the slot known in the state of the art for sliding the band of debit or credit cards through it.
- Payer or client (1) entity: entity that pays the funds of the transaction to be made. In this particular embodiment the client (1) is a client or payer smartphone mobile device (1) and uses an image sensor comprised in the client (1) mobile device to scan the QR code displayed on the screen of the POS terminal.

Descriptive Flow of the Process:

4.0.—The first server (2) or POS terminal collector starts the transaction and labels it as a payment operation with QR code.

4.1.—The first server (2) or POS terminal collector connects to the second server (3), sending
- the business identifier and
- the amount requested.

4.2.—The second server (3) checks in its database, from the business identifier,
- the business name
- the business account number and
- the business VAT code.

4.3.—The second server (3) generates a random number.

4.4.—The second server (3) generates a string by concatenating
- the random number generated and
- the business name,
- the concept of the operation,
- the amount of the operation,
- the currency of the operation, and
- the business account number obtaining a string such as, for example: "Num=43252&name=CarniceríaGómez&concept=Various&amount=35&currency=euro&num_cc=43530049884993829384"

4.5.—The second server (3) encodes the string generated using a AES (Advanced Encryption Standard) encryption scheme in CBC (cipher-block chaining) mode and the result is encoded in Base32 with its own conversion table, which advantageously increases encoding security.

4.6.—The second server (3) splits the string obtained into 2 parts:
- one part will contain the first 30 characters of the string and will be the "public" part of the information, and
- the rest of the string is stored in the database of the second server (3), being the "private" part of the information.

The public part will be sent in a QR code, whereas the private part resides in the second server (3). Therefore advantageously, even though someone tries to decode and decrypt the content of the string of the QR code, he/she cannot do so because he/she does not have the whole string to decode and decrypt, only the first 30 characters.

4.7.—The second server (3) generates a database identifier used to locate the private information stored in the database.

4.8.—The second server (3) generates a string with the following data:
- prefix (302), which is preferably bbvaqr://bbva? for example,
- string of 30 characters obtained or public part of the information,
- database identifier generated.

In one embodiment, this string is as follows: "bbvaqr://bbva?pp=ADFKERORMVMOECSKDOOEIWUURMWKWJ&id_data_base=329873"

4.9.—The second server (3) generates a QR code with the string of the preceding point, for example:
- setting the image format to bmp or bitmap format,
- establishing the appropriate size for the POS terminal, and
- advantageously obtaining the lowest possible density with a level of redundancy at zero, the level of redundancy being the number of error correction bits used and the density being the number of bits used for generating the code.

Advantageously in this embodiment, the QR code always contains the same amount of information, and therefore the density thereof never changes, regardless of the size of the complete information, because the first 30 characters are always sent and the rest is stored in the database. The QR code, therefore, does not contain data about the transaction.

4.10.—The second server (3) sends the image of the QR code to the POS terminal of the business and the latter displays it on the screen. In this embodiment, the QR has a validity for a predetermined time, for example 5 minutes, which advantageously prevents being able to reuse the code. The second server (3) verifies whether payment has been made until it is made, or at most until the predetermined time lapses.

4.11.—The client (1) or payer mobile device scans the image of the QR code using the image sensor.

4.12.—The client (1) or payer mobile device obtains the content of the QR code.

4.13.—The client (1) or payer mobile device applies a URL encode method to the content and sends it as a parameter in a call to a web service, for example a REST (Representational State Transfer) service for requesting validation in the second server (3) with the following parameters:
- content of the QR after the URL encode,
- internal client (1) entity application identifier,
- internal client (1) entity application key, information receiving mode, for example, json or XML.

The method is performed in the client (1), first server (2) and second server (3) as the result of an application running therein. The internal identifier and the internal key correspond to the internal and proper identifier and key of the application running in each entity (1, 2, 3).

The receiving mode is the manner in which the second server (3) sends the data about the transaction to the device or client (1) or payer entity once the QR code is validated.

4.14.—The second server (3):
- receives the request for validation of the information about a QR code,
- checks that the client (1) entity identifier and the client (1) entity key are correct,
- accesses the private information stored in the database and retrieves it to attach it to the 30 other characters using the database identifier,
- concatenates the 30 characters received in the request for validation with those obtained from the database and decodes and decrypts them, obtaining all the information relating to the operation,
- generates a json or XML with information about the transaction and sends it to the client (1) or payer entity in a secure manner or by means of the https protocol.

In this particular embodiment, the method for generating a code stores the private string of Y-M characters (105) which, together with the public string of Y characters (104), represents information that allows the second server (3) to obtain all the necessary data about the operation for providing (407) the information about the transaction to the client (1) so that the latter authorizes (408) the operation. Advantageously, vulnerable information such as account number, etc., is sent exclusively and directly to the client (1) by means of the https protocol such that a possible third party seeking to intercept the information is not capable of reading it.

4.15.—The client (1) or payer mobile device receives the data about the transaction and checks that they are correct, 4.16.—The client (1) or payer mobile device
- receives the data about the transaction,
- reviews the data about the transaction,
- authorizes the operation by means of sending the operation key to the second server (2) in the event of agreement.

4.17.—The client (1) or payer mobile device:
- receives a single-use key which is sent by means of an sms in a particular embodiment if the operation key is correct,
- ends the authorization by sending the single-use key.

4.18.—The first server (2) or POS terminal collector receives a confirmation of the correct termination of the transaction.

4.19.—The client (1) or payer mobile device receives the confirmation of the correct termination of the transaction and of the details corresponding to it.

Example 3

Signing Operations

Figure 5:
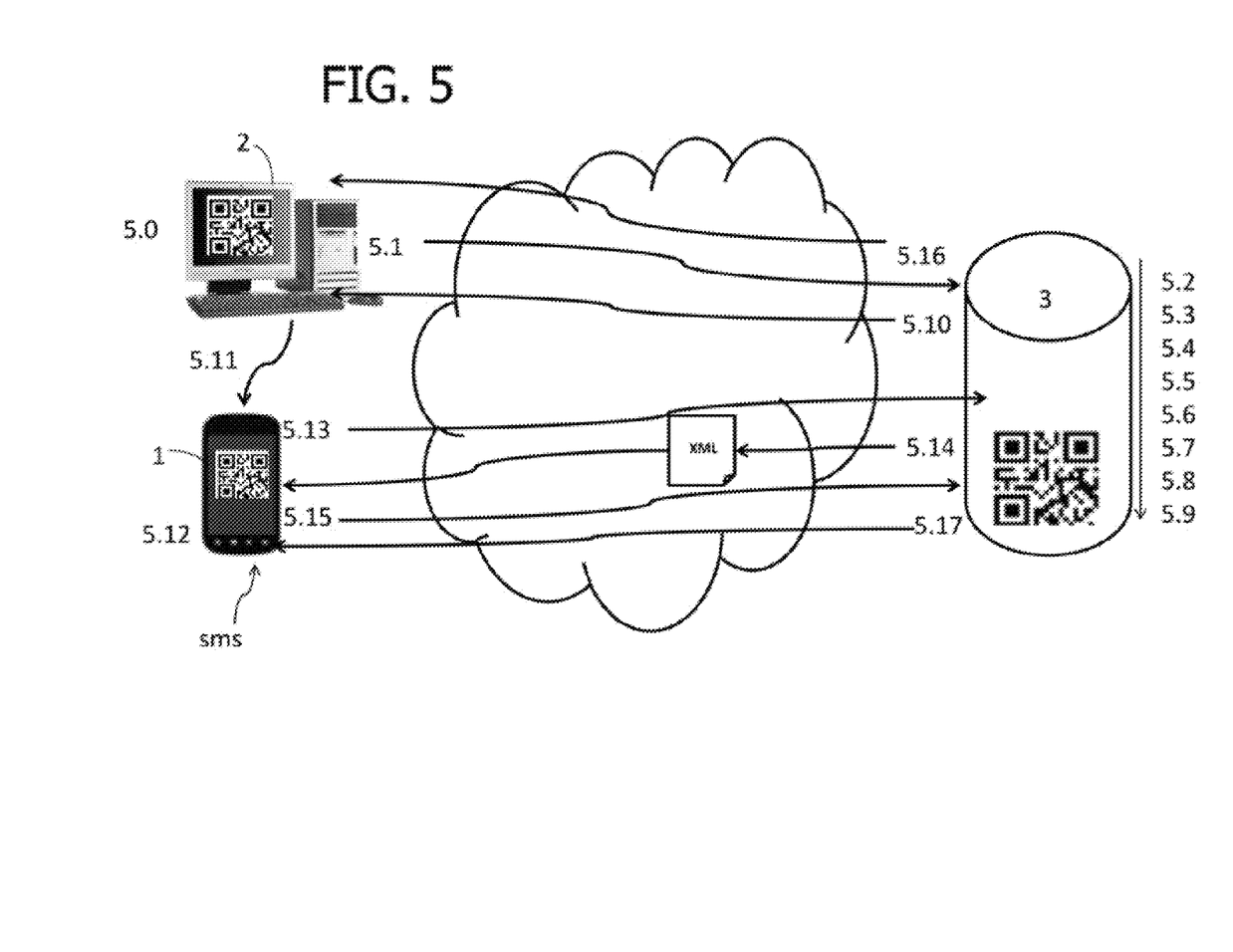
FIG. 5 shows a particular embodiment of a method according to the invention, in which operations in an alternative or out-of-band channel are authorized or signed.

FIG. 5 shows a particular embodiment of the method according to the invention in which an operation on an online banking web page is signed through an alternative or out-of-band channel.

In this example the first server (2) is a computer for connecting to internet and the client (1), for example a smartphone mobile device; accesses a web page hosted in the second server (3) through the computer. The smartphone mobile device can be used by a user. The client (1) can be any one of a tablet, robot, computer, or any other device suitable for browsing on web pages. The client (1) can be used by a user or machine.

In this example, security of the client (1) advantageously increases in the context of electronic operations conducted over internet.

The QR codes are used as means for transmitting sensitive or vulnerable information in the process of signing or authorizing operations and thereby preventing a user handling the first server (2) from having to enter passwords with the risk of being intercepted and copied by a third party.

In this embodiment, the authorization of the operation is closed and completed in an alternative device and the problems that may result from a situation in which the first server (2) or computer being used to connect to internet and carry out the main relationship of a user of the computer or first server (2) and of the client (1) with the second server (3), for example a bank, is somehow comprised by a virus, man in the middle, etc., are advantageously prevented.

As an additional alternative, for further security the user can enter a pin code in the smartphone mobile device to complete the signing in the system.

Descriptive Flow of the Process:

5.0.—The first server (2) computer starts an operation for signing operations and labels it as a signing operation with QR code.

5.1.—The first server (2) computer connects to the second server (3), sending
- the identifier of a user using the first server (2) computer,
- internal first server (2) application identifier,
- internal first server (2) application key and
- the details of the operation being performed.

5.2.—The second server (3) checks in its database, from the identifier of the user and the first server (2) identifier and key that the user is authorized by the second server (2).

5.3.—The second server (3) generates a random number.

5.4.—The second server (3) generates a string by concatenating
- the random number generated,
- the data about the operation, obtaining a string such as, for example: "Num=43252&operation=Transfer&Recipient=Name and last names&concept=Various&amount=35&currency=euro"

5.5.—The second server (3) encodes the string generated using an AES (Advanced Encryption Standard) encryption scheme in CBC (cipher-block chaining) mode and the result is encoded in Base32 with its own conversion table, which advantageously increases encoding security.

5.6.—The second server (3) splits the string obtained into 2 parts:
- one part will contain the first 30 characters of the string and will be the "public" part of the information, and
- the rest of the string is stored in the database of the second server (3), being the "private" part of the information.

The public part will be sent in a QR code, whereas the private part resides in the second server (3). Therefore advantageously, even though a third party tries to decode and decrypt the content of the string of the QR code, he/she cannot do so because he/she does not have the whole string to decode and decrypt, only the first 30 characters.

5.7.—The second server (3) generates a database identifier used to locate the private information stored in the database.

5.8.—The second server (3) generates a string with the following data:
- prefix (302), which is preferably bbvaqr://bbva? for example, string of 30 characters obtained or public part of the information,
database identifier generated.

In one embodiment, this string is as follows: "bbvaqr://bbva?pp=ADFKERORMVMOEC&token=329873"

5.9.—The second server (3) generates a QR code with the string of the preceding point, for example:
setting the image format to bmp or bitmap format,
establishing the appropriate size for the first server (2) computer, and
advantageously obtaining the lowest possible density with a level of redundancy at zero, the level of redundancy being the number of error correction bits used and the density being the number of bits used for generating the code.

Advantageously in this embodiment, the QR code always contains the same amount of information, and therefore the density thereof never changes, regardless of the size of the complete information, because the first 30 characters are always sent and the rest is stored in the database. The QR code, therefore, does not contain data about the transaction.

5.10.—The second server (3) sends the image of the QR code to the first server (2) computer and the latter displays it on the screen. In this embodiment, the QR has a validity for a predetermined time, for example 5 minutes, which advantageously prevents being able to reuse the code. The second server (3) verifies whether the operation has been signed until it is done, or at most until the predetermined time lapses.

5.11.—The client (1) smartphone mobile device scans the image of the QR code using the image sensor.

5.12.—The client (1) smartphone mobile device obtains the content of the QR code.

5.13.—The client (1) smartphone mobile device applies a URL encode method to the content and sends it as a parameter in a call to a web service, for example a REST (Representational State Transfer) service for requesting validation in the second server (3) with the following parameters:
content of the QR after the URL encode,
client (1) application identifier,
client (1) application key,
information receiving mode, for example, json or XML.

The method is performed in the client (1), first server (2) and second server (3) as the result of an application running therein. The internal identifier and the internal key correspond to internal and proper identifier and key of the application running in each entity (1, 2, 3).

The receiving mode is the manner in which the second server (3) sends the data about the operation for accessing the web page to the client (1) smartphone mobile device once the QR code is validated.

5.14.—The second server (3):
receives the request for validation of the information of a QR code,
checks that the client (1) identifier and the client (1) key are correct,
accesses the private information stored in the database and retrieves it to attach it to the 30 other characters using the database identifier,
concatenates the 30 characters received in the request for validation with those obtained from the database and decodes and decrypts them, obtaining all the information relating to the operation,
generates a json or XML with the information about the operation to be signed and sends it to the client (1) in a secure manner or by means of the https protocol.

In this particular embodiment, the method for generating a code stores the private string of Y-M characters (105) which, together with the public string of Y characters (104), represents information that allows the second server (3) to obtain all the necessary data about the operation such that they are enough for providing (407) the information about the operation to the client (1) so that the latter authorizes (408) the operation. In this particular embodiment, these data are all the details of the operation to be signed. Advantageously, when receiving the data about the operation to be signed in the client (1), the user of the client (1) will be aware that a signing operation has started, being able to not end the operation if said operation was not started by him/her. Security therefore increases.

5.15.—The client (1) smartphone mobile device:
receives the data about the operation to be signed,
reviews the data about the operation and,
accepts the operation by sending a 4-digit PIN in the event of agreement,
could optionally send an sms comprising a single-use key like in preceding examples.

5.16.—The first server (2) computer receives confirmation that the client (1) has signed the operation.

5.17.—The client (1) smartphone mobile device receives the confirmation of the correct signing of the operation.

Example 4

Cash Withdrawal in an Automated Teller Machine

Figure 6:
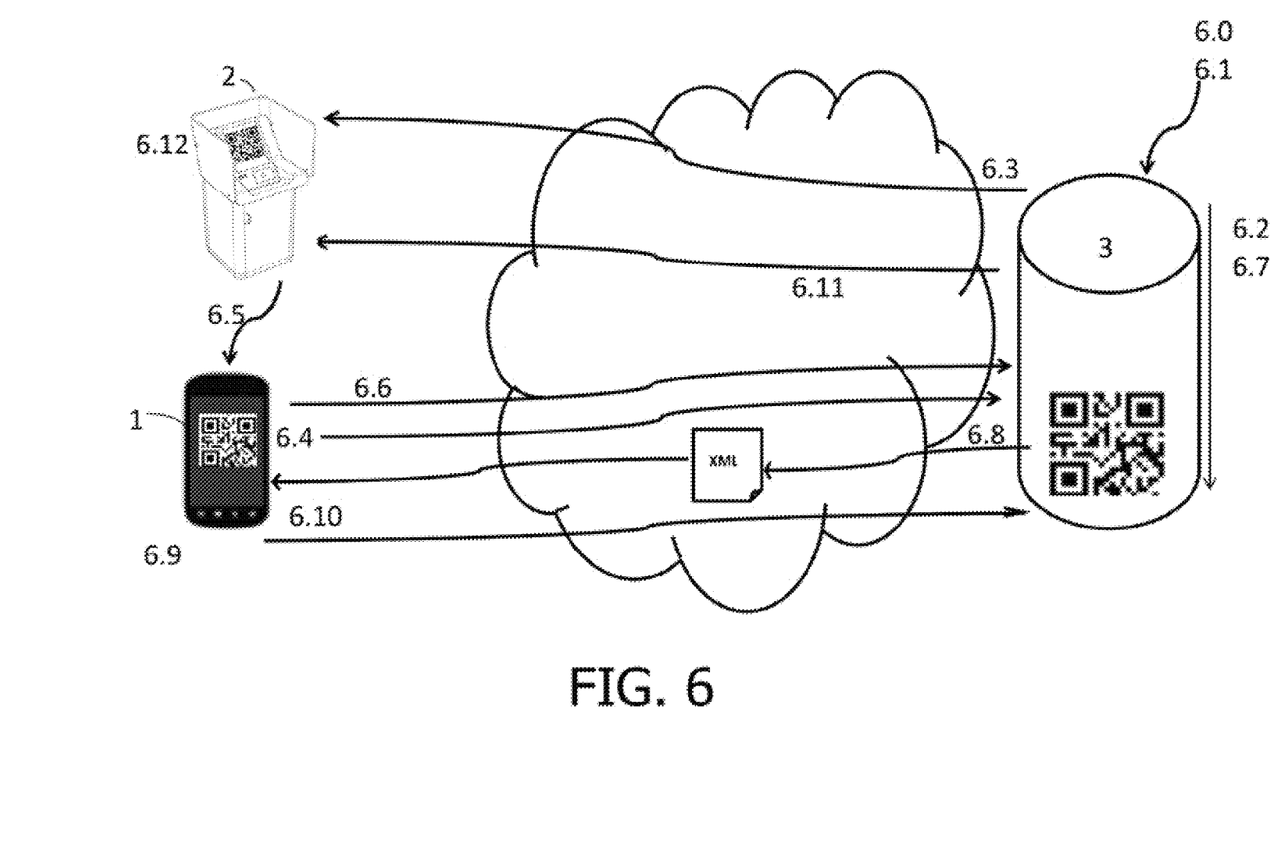
FIG. 6 shows a particular embodiment of a method according to the invention, in which cash is withdrawn from an automated teller machine.

The advantage of this example of the method is to offer a user means for optimizing the time he/she has available in transactions or operations which require a physical interaction such as cash withdrawals and deposits in automated teller machines.

The client (1) registers operations that are ready and pending completion in the second server (3) and once the client (1) operates with a first server (2) or automated teller machine, the process of terminating the operation is triggered through a QR code.

The first server (2) or automated teller machine must be suitable for displaying by some display means a QR code generated by the second server (3).

The following steps depicted in FIG. 6 will therefore be performed for generating the QR of each second server (2) or client:

6.0 An XML or string is generated with the following information:
Unique first server (2) or automated teller machine identifier.
Location.
Geographic coordinates.

6.1.—The second server (3) is asked to generate a QR code with the information of point 6.0.

In a particular embodiment, this request (6.1) is sent from the automated teller machine (2), in another particular and non-limiting embodiment, this request (6.1) is made from a central server not depicted in FIG. 6.

6.2.—The second server (3) performs the following operations:
Generates a random number which, when concatenated to the rest of the information, cause the string containing the QR to be always be different from the rest.
Generates a string by concatenating the number generated and the rest of the parameters of the operation, obtaining a string of the following type:

"Num=43252&identifier_automated teller machine=11223344455&location=Plaza Maria Soledad Torres Acosta&coordinates=3453454564645, 4565436456456"

The string generated is encrypted using the AES scheme in CBC mode and the result is encoded in Base32 with its own conversion table, which increases encoding security.

Splits the string obtained into 2 parts. One part contains the first 30 characters and will be the "public" part of the information, and the rest of the string is stored in the database, being the "private" part of the information. The public part will be sent in the QR, whereas the private part will always reside in the second server (3). Therefore, even though someone tries to decode and decrypt the content of the string of the QR, he/she cannot do so because he/she would not have the complete string to decode and decrypt, only the first 30 characters.

A database identifier which will serve to locate the private information stored in the database is generated.

A string is generated with the following data:
prefix (302) for example bbvaqr://bbva?
string of 30 characters obtained (public part of the information).
Database identifier generated.

This string will be of the following type: "bbvaqr://bbva?pp=ADFKERORMVMOEC&token=329873"

The second server (3) calls service for generating a QR which contains the string obtained in the preceding point. By using this method, the QR always contains the same amount of information, and therefore the density thereof never changes, regardless of the size of the information it contains because the first 30 characters will always be sent and the rest will be stored in the database. The QR, therefore, does not contain the complete data of the first server (2) or automated teller machine.

6.3—The second server (3) sends the QR code to the second server (2) or automated teller machine.

At this point, the code (108) is visible in the automated teller machine either in display means or printed out in an external casing of the automated teller machine (2). From the time that the code (108) is available and visible, a client (1) can scan or capture it without time restrictions.

6.4—At some time, the client (1) using the application starts a cash withdrawal operation that remains pending in the server (3).

6.5—At some time, for example not more than two hours later, the client (1) captures the QR code (108) of the automated teller machine (2) with the image sensor. This action triggers the start of the process for terminating the operation that the client (1) started in point 6.4 and remained pending.

6.6.—The client (1) obtains the content of the code (108). He/she applies the URL encode method and sends it as a parameter in a call to the REST service for the corresponding validation in the second server (3) with the following parameters:
identifier of a user using the client (1),
content of the QR after the URL encode,
internal client application identification,
internal application key, and
information receiving mode (json/xml).
The receiving mode is the manner in which the server will send the data about the operation to the device of the user once the QR is validated.

6.7.—The server receives the request for validation of the information of a QR and performs the following operations:

Checks that the internal client application identification and key are correct.
Accesses the private information stored in the database and retrieves it to attach it to the 30 other characters using the database identifier.
Concatenates the 30 characters received in the call with those obtained from the database and decodes and decrypts them.
The second server (3) checks that there is a pending cash withdrawal operation and retrieves the amount to be withdrawn using the client (1) user identifier.
Generates a json or xml with the information about the operation (amount and data of the automated teller machine).

6.8.—The second server (3) sends the information about the operation, such as amount and data of the automated teller machine (2) for example, to the client (1) in a secure manner (https).

6.9.—The client (1) verifies that it is at the right automated teller machine.

6.10.—If it is the right machine, the client (1) sends a 4-digit PIN to the second server (3) to complete the process.

6.11.—The second server (3) verifies that the PIN entered is correct and sends an order to dispense the requested cash to the first server (2) or automated teller machine.

6.12.—The automated teller machine dispense the cash, considering that the operation has ended.

Entering credentials into the automated teller machine that can be intercepted by a third party is advantageously prevented in this embodiment.

The invention claimed is:

1. A method for generating a code (108), characterized in that the method comprises the steps of:
a.—providing a first character string (101) of W characters,
b.—encrypting (110) the first character string (101), obtaining an encrypted string (102),
c.—encoding (111) the first encrypted string (102), obtaining an encrypted and encoded string of Y characters (103),
d.—splitting (112) the string of Y characters (103) into:
a public string of M characters (104), and
a private string of Y-M characters (105),
e.—concatenating (113) at least:
the public string of M characters (104), and
additional information (106),
obtaining a second character string (107),
f.—encoding (114) the second character string (107), obtaining the code (108).

2. The method according to claim 1, characterized in that the encoding method of step f.— is an encoding method for encoding QR codes, a QR code being obtained as the code (108).

3. The method according to claim 1, characterized in that the additional information in step e.— comprises at least
one database identifier (301) indicating a memory address of a storage unit where the private string of Y-M characters (105) is stored,
one prefix (302).

4. The method according to claim 1, characterized in that the first character string (101) of W characters is a string obtained by a method comprising the following steps:
providing a string of information (201),
decoding and decrypting said information (201) if the information (201) is encrypted and encoded information,
generating (210) a random number (202), concatenating (211) the random number to all or part of the string of information (201) provided, an initial string (101) being obtained.

5. The method according to claim 4, wherein the string of information (201) is encrypted and encoded information.

6. An authorization method for authorizing an operation implemented in a system comprising,
a client (1),
a first server (2),
a second server (3) in communication with the first server (2) and in communication with the client (1),
characterized in that the authorization method comprises the steps of:
a.—requesting (401) the second server (3) a code (108), the request comprising a string with operation data (4),
b.—the second server (3) generating (402) a code (108) from a string with operation data (4) according to a method according to claim 1,
c.—the second server (3) sending (403) the code (108) to the first server (2),
d.—the client (1) transferring (404) the code (108) from the first server (2) to the client (1),
e.—the client (1) decoding (405) the code (108), obtaining the second character string (107),
f.—the client (1) ending (408) the authorization by sending an authorization confirmation to the second server (3).

7. The method according to claim 6, characterized in that after step f.—, step g.— is performed, with:
g.—the second server (3) running (409) the operation.

8. The method according to claim 7, characterized in that, in step a.— the request (401) comprises an XML or Extensible Markup Language file with the operation data (4) encrypted by an AES encryption method and encoded by a Base64 encoding method, the XML file comprising operation information.

9. The method according to claim 6, characterized in that the following steps are implemented between step e.— and step f.—:
e1.—the client (1) requesting (406) operation information from the second server (3), and
e2.—the second server (3) providing (407) operation information.

10. The method according to claim 9, characterized in that
in step e1.— the request (406) for operation information is performed together with a client (1) application identifier and application key, and
in step e2.— the provision (407) of the operation information is performed if the client (1) application identifier and application key are correct, where a correct client (1) identifier and key are a client (1) application identifier and application key:
known by the second server (3) and
which corresponds with the client (1) from which they are received.

11. The method according to claim 9, characterized in that, after step e2.— the following steps are implemented:
e3.—the client (1) sending an operation key,
e4.—receiving a single-use key (5) in the client (1),
in step f.— the client (1) ending (408) the authorization is performed by sending the single-use key (5).

12. The method according to claim 11, wherein the single-use key (5) in the client (1) is received by means of an sms or short message service message.

13. The method according to claim 9, characterized in that in step e1.—,
the request (406) for additional information comprises the data obtained in step e.— encoded by a URL encode method and
the request (406) for additional information is made with a call to a web service of the second server (3),
in step e2.— the information requested (406) comprises operation information that is obtained by the second server (3) after having implemented a method comprising the steps of:
receiving the call to a web service of the second server (3),
checking (411) that the client (1) identifier and the client (1) key are correct,
using the database identifier (301) to access the private string of Y-M characters (105) stored in the memory of a storage unit and retrieving the private string of Y-M characters (105) to attach to the data obtained in step e1.— received in the call to a web service,
concatenating (410) the data (500) obtained in step e1.— received in the call to a web service with the private string of Y-M characters (105),
decoding and decrypting the resulting string, the second server (3) obtaining the operation information,
providing (407) operation information.

14. The method according to claim 13, wherein the request (406) for additional information in step e1.— is made with a call to a Representational State Transfer service for requesting validation in the second server (3) and the call comprises the parameters,—
result of encoding the data (500) obtained in step e.— after encoding by means of URL encode,
internal client (1) identifier,
internal client (1) key, and
information receiving mode.

15. The method according to claim 13, wherein the call to a web service of the second server (3) in step e2.— comprises a request for validation of the information in the second server (3).

16. The method according to claim 13, wherein the operation information provided (407) in step e2.— is provided in the receiving mode selected in step e1.—.

17. The method according to claim 6, characterized in that the operation is a transfer operation for transferring from a bank account associated with the client (1) to a bank account associated with the first server (2).

18. The method according to claim 6, characterized in that the code (108) is a QR image, or two-dimensional code, and
in step d.—the transfer is performed by capturing the code (108).

19. The method according to claim 6, characterized in that the code (108) is transferred from the first server (2) to the client (1) using near field communication.

20. An authorization system for authorizing an operation comprising the following entities,
a client (1),
a first server (2), and
a second server (3) in communication with the first server (2) and in communication with the client (1),
characterized in that
the three entities (1, 2, 3) are suitable for implementing the steps of an authorization method comprising the steps of:
a.—requesting (401) the second server (3) a code (108), the request comprising a string with operation data (4), b.—the second server (3) generating (402) a code (108) from a string with operation data (4) according to a method according to claim 1, c.—the second server (3) sending (403) the code (108) to the first server (2), d.—the client (1) transferring (404) the code (108) from the first server (2) to the client (1), e.—the client (1) decoding (405) the code (108), obtaining the second character string (107), f.—the client (1) ending (408) the authorization by sending an authorization confirmation to the second server (3), the second server (3) is suitable for implementing the steps of the method for generating a code (108) according to claim 1, and the client (1) is suitable for decoding a code (108) generated by means of the method according to claim 1.

21. The system according to claim 20, characterized in that the client (1) is a device comprising an image sensor or it is a device comprising an antenna suitable for working with near field communication, or a device comprising an image sensor and an antenna suitable for working with near field communication.

22. A non-transitory computer-readable medium having computer program code embodied thereon, the computer program code, when executed on a computing device, configured to perform the steps of a method according to claim 6, when said program works in the second server (3).

23. A non-transitory computer-readable medium having computer program code embodied thereon, the computer program code, when executed on a computing device, configured to perform the steps of a method according to claim 6 when the steps are implemented by the client (1), the first server (2), or the second server (3).

* * * * *